US012230492B1

(12) United States Patent
Patel et al.

(10) Patent No.: US 12,230,492 B1
(45) Date of Patent: Feb. 18, 2025

(54) ATOMIC VAPOR SOURCE FOR QUANTUM METROLOGY

(71) Applicant: Vector Atomic, Inc., Pleasanton, CA (US)

(72) Inventors: Parth Bharatkumar Patel, Fremont, CA (US); Martin Machai Boyd, Pleasanton, CA (US); William David Lunden, Dublin, CA (US); Daniel Sheredy, Castro Valley, CA (US)

(73) Assignee: Vector Atomic, Inc., Pleasanton, CA (US)

( * ) Notice: Subject to any disclaimer, the term of this patent is extended or adjusted under 35 U.S.C. 154(b) by 0 days.

(21) Appl. No.: 18/789,193

(22) Filed: Jul. 30, 2024

(51) Int. Cl.
*H01J 49/24* (2006.01)
*H01J 49/04* (2006.01)
*H01J 49/16* (2006.01)
*H01J 49/42* (2006.01)

(52) U.S. Cl.
CPC ...... *H01J 49/4205* (2013.01); *H01J 49/0409* (2013.01); *H01J 49/0468* (2013.01); *H01J 49/16* (2013.01); *H01J 49/24* (2013.01)

(58) Field of Classification Search
CPC ............... H01J 49/4205; H01J 49/0409; H01J 49/0468; H01J 49/16; H01J 49/24
USPC ................................ 250/281, 282, 288, 251
See application file for complete search history.

(56) References Cited

U.S. PATENT DOCUMENTS 8,005,332 B2 8/2011 Schmidt et al.
9,117,563 B2 8/2015 Hughes et al.
2015/0200029 A1* 7/2015 Hughes .................. G21K 1/006 250/251

FOREIGN PATENT DOCUMENTS

WO 2007109815 A1 10/2007
WO 2023172473 A2 9/2023

OTHER PUBLICATIONS

Winnicki, et al ("Thermal Emission of Strontium in a Cryogenic Buffer Gas Beam Source," arXiv.2407.09907v1 (physics.atom-ph) Jul. 13, 2024 (Year: 2024).*
Hsu et al., Laser-induced thermal source for cold atoms, Scientific Reports, (2022) 12:868.
Pate et al., Microfabricated strontium atomic vapor cells, Optics Letters, vol. 48, No. 2, Jan. 15, 2023, pp. 383-386.
Kock et al., Laser controlled atom source for optical clocks, Scientific Reports, 6:37321, Nov. 18, 2016.
(Continued)

*Primary Examiner* — Michael Maskell
(74) *Attorney, Agent, or Firm* — Patterson + Sheridan, LLP

(57) ABSTRACT

Embodiments herein describe using compressed source material to perform an atomic experiment or an atomic application within a vacuum chamber (e.g., an atom cooling and trapping apparatus). Source material is often refined and sold with dendritic or crystalline surfaces that result in a very large surface area. This surface area increases the likelihood that a large amount contaminants will form on the surface, which is especially true for reactive source materials. To mitigate the risk of contamination, in the embodiments herein the source material is compressed onto a substrate. This changes the material from having a dendritic or crystalline surface to a flat surface, which has a much smaller surface area and thus is less susceptible to contaminants which can, for example, improve the lifetime usage of the source material.

19 Claims, 7 Drawing Sheets

(56) References Cited

OTHER PUBLICATIONS

Osada et al., Compact atom source using fiber-based pulsed laser ablation, arXiv:2302.07639v1 [physics.atom-ph] Feb. 15, 2023.
Alvatec, ALVASOURCE® for PHOTOMULTIPLIERS, OLEDs and Bose Einstein Condensation, https://periodictable.com/Samples/055.5/Alvasource_Folder.pdf.
Kwon et al., Jet-loaded cold atomic beam source for strontium. Rev. Sci. Instrum. Jan. 1, 2023; 94 (1): 013202, https://doi.org/10.1063/5.0131429.
Bridge et al., A vapor cell based on dispensers for laser spectroscopy, Rev. Sci. Instrum. Jan. 1, 2009; 80 (1): 013101.
Winnicki et al., Thermal Emission of Strontium in a Cryogenic Buffer Gas Beam Source, arXiv:2407.09907v1 [physics.atom-ph] Jul. 13, 2024.

* cited by examiner

ATOMIC VAPOR SOURCE FOR QUANTUM METROLOGY

STATEMENT OF GOVERNMENT INTEREST

This invention was made with government support under contract DARPA 1557922 awarded by Defense Advanced Research Projects Agency (DARPA) Atomic-Photonic Integration (APHI). The government has certain rights in the invention.

BACKGROUND

Field

Embodiments of the present invention generally relate to atomic sources for quantum metrology.

Description of the Related Art

Laser cooling and trapping is the ability to cool atoms down to unprecedented kinetic temperatures, and to confine and support isolated atoms in "atom traps". This unique new level of control of atomic motion allows researchers to study the behavior of atoms and quantum mechanical properties. Atomic trapping and cooling are typically used in applications such as time/frequency standards (atomic clocks), GPS systems and navigation, research on fundamental constants, quantum information (computing and encryption), and atom interferometry.

An ultra-cold atom apparatus for laser cooling and trapping typically includes a source material (e.g., Strontium (Sr), calcium (Ca), beryllium (Be), alkalines, etc.) which is heated to emit atom vapor in a vacuum chamber. This vapor is then trapped to form atom clouds using lasers (or magnetic fields). However, current solutions often use internal ovens in the vacuum chamber to heat the source material, which increases the size and power consumption of the apparatus. Also, the source material is often highly reactive and as a result often includes contaminants (e.g., oxide or hydroxide layers). The contaminants can increase the vacuum pressure and reduce the lifetime of the apparatus.

SUMMARY

One embodiment described herein is a vacuum chamber that includes a source material that has been pressed to reduce surface area where the source material is attached to a substrate and the source material emits an atom vapor when heated to perform an atomic experiment or an atomic application within the vacuum chamber.

Another embodiment described herein is a method that includes placing source material on a substrate, pressing the source material onto the substrate to reduce a surface area of the source material where the source material is attached the substrate, and placing the source material and the substrate into a vacuum chamber that is configured to use an atom vapor emitted when the source material is heated to perform an atomic experiment or application.

Another embodiment described herein is a method that includes heating a source material in a vacuum chamber to emit an atom vapor, where the source material has been altered to reduce a surface area of the source material and where the source material is attached to a substrate. The method also includes perform an atomic experiment or an atomic application within the vacuum chamber using the atom vapor.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments herein describe using compressed source material in an atom cooling and trapping apparatus. Source material is often refined and sold with dendritic or crystalline surfaces that result in a very large surface area. This surface area increases the likelihood that a large amount contaminants will form on the surface, which is especially true for reactive source materials. For example, when placed in an environment with oxygen or water, oxide and hydroxide layers can form on the surface of the source material.

To mitigate the risk of contamination, the embodiments herein compress the source material onto a substrate. This changes the material from having a dendritic or crystalline surface to a flat surface, which has a much smaller surface area and thus is less susceptible to contaminants which can improve the lifetime usage of the source material. Further, the compressed source material and the substrate can be heated using external lasers rather than an oven within the vacuum chamber of the apparatus. This can reduce the size of the atom cooling and trapping apparatus. Also, because the source material is compressed into a flat surface, it is easier to target the source material with the laser relative to targeting a dendritic or crystalline surface.

Moreover, the substrate can serve as a baffle to prevent the atoms emitted by the source material from coating a window used by the external laser to heat the source material. For example, the substrate can be transparent so that the external laser can pass through the substrate to heat the source material. The substrate also blocks the emitted atoms from the source material from coating the window used to couple the external laser into the vacuum chamber. In addition, the substrate can thermally isolate the source material from the other components in the apparatus.

In another embodiment, rather than using lasers to heat the compressed source material, a resistive heater can be integrated into the substrate. The resistive heater can use an electrical current to generate heat which then causes the source material to emit atoms into the vacuum chamber.

Figure 1:
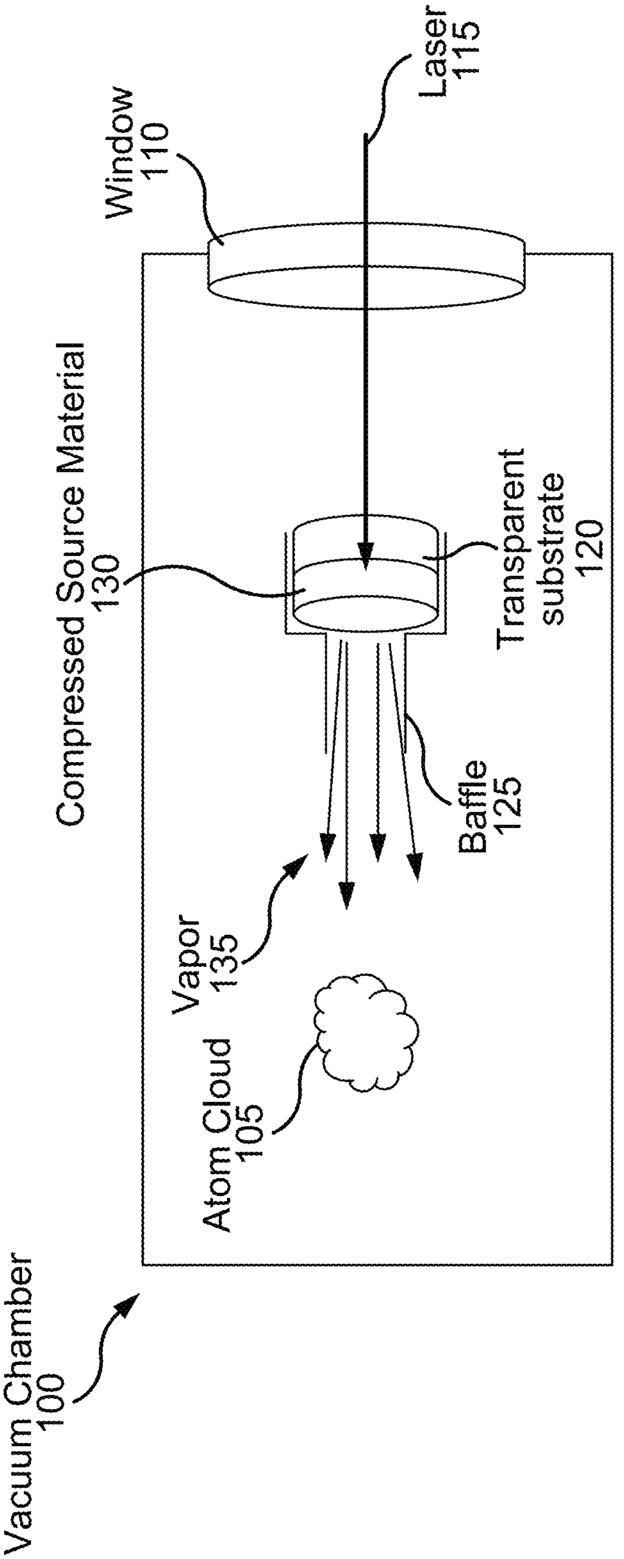
FIG. 1 illustrates a vacuum chamber for atom cooling and trapping, according to one embodiment.

FIG. 1 illustrates a vacuum chamber 100 for atom cooling and trapping, according to one embodiment. As shown, the vacuum chamber 100 can use an array of lasers or magnetic fields to trap atoms emitted by a compressed source material 130 to generate an atom cloud 105 in the presence of a vacuum (e.g., an ultra-high vacuum (UHV)). That is, the compressed source material 130 is heated by a laser 115 which causes the material 130 to emit the vapor 135 (e.g., gaseous atoms of the source material 130). While some source materials emit a vapor 135 at relatively low temperatures, e.g., 50 degrees Celsius, other may emit vapor 135 at much higher temperatures, e.g., 300-500 degrees Celsius such as Sr.

The atom vapor 135 can be used to perform many different kinds of quantum applications such as atomic clocks, GPS systems and navigation, research on fundamental constants, quantum information, and atom interferometry. The embodiments herein are not limited to any particular technique for slowing down the atoms in the vapor 135 to form the cloud 105, nor is it limited to any particular application of the atom cloud 105. For example, the atom vapor 135 can be slowed/cooled/trapped using techniques such as 2D magneto-optical trap (MOT), 3D MOT, and/or Zeeman slowing. As specific examples, the vapor 135 can be used to make an atomic vapor beam; or the vapor 135 is cooled using a Zeeman slower or a 2D MOT; or slowed/cooled atoms can be trapped in a MOT, a magnetic trap, or an optical trap. In one embodiment, the vacuum chamber 100 is (or is part of) a low size, weight, and power (SWaP) device that produces source atom vapor for use in an ultra-cold atom apparatus.

In contrast to an in-vacuum oven where the means for heating the source material 130 is disposed in the vacuum chamber 100, here one or more external lasers 115 are used to heat the source material 130. The vacuum chamber 100 includes a window 110 through which the laser 115 can pass in order to reach the compressed source material 130. Further, the compressed source material 130 is disposed on a transparent substrate 120 so that the laser 115 can pass through the substrate 120 to reach the compressed source material. For example, the transparent substrate 120 can be sapphire or glass. However, the substrate 120 is not limited to any particular material so long as the material is transparent and can maintain structural integrity at the temperatures needed to cause the source material 130 to emit the vapor 135.

In one embodiment, the material of the substrate 120 is thermally insulating, which can reduce the amount of energy used to generate the vapor 135. That is, a thermally insulating substrate 120 helps to keep the source material 140 hot and mitigate the amount of heat that is lost to the surrounding components in the vacuum chamber 100.

In another embodiment, the substrate 120 can be optically opaque. In that case, the heating laser is absorbed by the substrate 120, which in turn heats the source material 140.

In one embodiment, the laser 115 is a continuous wave (CW) laser. However, in another embodiment, the laser 115 is pulsed. For example, cold-atom experiments or applications are often periodic or pulsed. The pulsing of the laser 115 can be synchronized (but does not have to be) with the periodicity or pulse of the experiment or application (such as when the atom cloud 105 is being formed). This means that the vapor 135 is released only when it is used by the experiment or application, which can save power and extend the lifetime of the source material 130 (e.g., reduce the rate at which it is depleted). Another potential benefit is that reduced vapor pressure results in better cold atom lifetime (since cold atoms are less likely to be knocked off their trap by hotter ones from the source) during the off state. This can be beneficial for some scientific experiments.

The embodiments herein are not limited to any particular type of laser 115. Moreover, the wavelength of the laser 115 may depend on the type of the source material 130. Some suitable laser wavelengths include 808 nm and 980 nm.

While FIG. 1 illustrates using an external heating source (e.g., the laser 115) to heat the compressed source material 130, the embodiments herein can also be used in an in-vacuum oven. As discussed in more detail in FIG. 8 below, a heating element could be disposed in the substrate and used to heat the source material 130. For example, a current could be used to heat a resistive heater in the substrate 120. However, having to connect the heater in the substrate 120 to a power source may complicate the assembly of the vacuum chamber and cause the vacuum chamber to be larger relative to using the laser 115 as the heat source. Further, using a resistive heater creates a magnetic field which can impact the atom cloud 105. As such, the substrate 120 (and the sourced material 130) may be spaced farther apart from the area that includes the atom cloud 105 so that the magnetic field generated by the heating current does not negatively impact the atom cloud 105. This can further impact the size and compactness of the vacuum chamber 100. Put differently, using the laser 115 may allow the source to be placed closer to cold-atoms experiments for higher atomic flux without worrying about stray magnetic fields generated from heater wire. Moreover, the laser 115 may have lower power requirements than a resistive heater since the source is being heated directly, and using the laser 115 can lower the risk of failure.

The vacuum chamber 100 also includes a baffle 125 formed around the compressed source material 130. The baffle 125 could be a part of either the vacuum chamber or the source holder and can help prevent the vapor 135 from traveling to other, undesired parts of the vacuum chamber 100. That is, the baffle 125 can prevent the vapor 135 from going in undesired directions within the vacuum chamber 100. For example, the baffle 125 may prevent the vapor 135 from coating windows (not shown) that are used by the array of lasers that slow down the vapor 135 in order to create the atom cloud 105.

Further, the substrate 120 can serve as another baffle to prevent the compressed source material 130 for emitting the vapor 135 in a direction to the window 110. Because of the substrate 120, the compressed material 130 cannot emit atom vapor 135 in a direction towards the window 110. As such, the vapor 135 does not coat the window 110 which would create a reflective mirror that reflects the laser 115 so that it cannot enter into the vacuum chamber 100. However, the vapor 135 can coat the sides of the baffle 125 but this is acceptable since the vapor 135 will be emitted in the direction of the atom cloud 105 and not coat any other laser windows.

Figure 2:
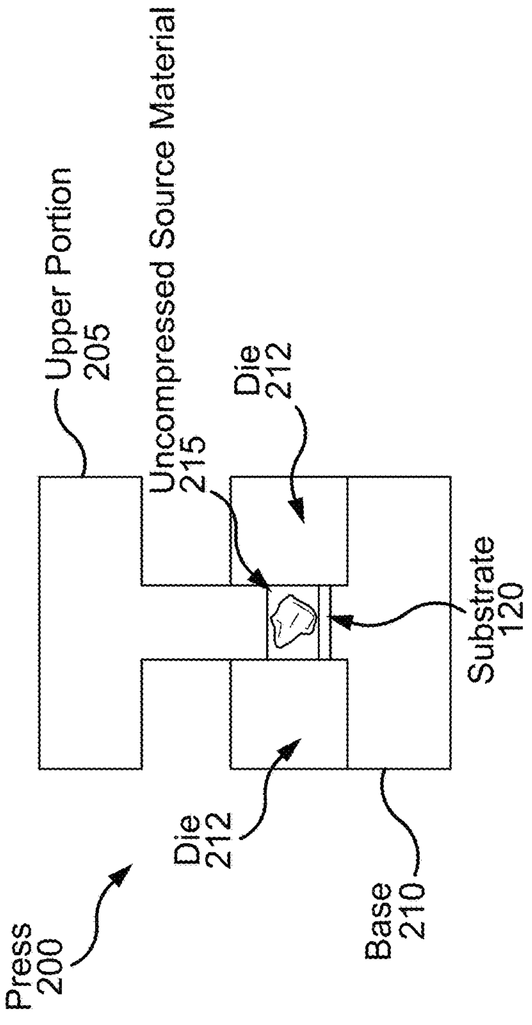
FIG. 2 illustrates a press for pressing source material onto a substrate, according to one embodiment.

FIG. 2 illustrates a press 200 for pressing source material 215 onto a substrate 120, according to one embodiment. In this example, the substrate 120 is loaded onto a base 210 of the press 200. For instance, an upper portion 205 of the press 200 may be raised so that the substrate 120 can be placed on the base 210.

The substrate 120 is not limited to any particular size. In one embodiment, the substrate 120 may have a diameter of ⅛ of an inch to ½ of an inch. Further, the thickness of the substrate 120 may range from 1-10 millimeters. Further, the substrate 120 can have different shapes such as cylindrical or cubic.

Once the substrate 120 is placed on the base 210, the uncompressed source material 215 can be placed on the substrate 120. In one embodiment, the uncompressed source material 215 has dendritic or crystalline surface, but is not limited to such. The embodiments herein can advantageously be used with any suitable source material that has a non-planar surface area.

The upper portion 205 of the press 200 is lowered to contact the uncompressed source material 215 and compress it onto the substrate 120 where the upper portion 205 of the press 200, the substrate 120 and a die 212 reform the source material 215 into a desired shape that reduces the surface area of the material 215. This pressure can cause the source material 215 to adhere to the substrate 120. That is, there may not be a need for any kind of adhesive material to cause the source material 215 to stick or bond to the substrate 120. However, in other embodiments, an adhesive layer or material (which may be transparent) is disposed between the substrate 120 and the uncompressed source material 215 to help bond or adhere the source material 215 to the substrate 120.

The force applied by the press 200 can vary depending on the type of the source material and the size of the substrate 120. As an example, an approximately 1 ton-force can be used to compress Sr to form a substantially even layer on a sapphire substrate 120 with a ¼ inch diameter.

After compression, the source material now forms a compressed layer on the substrate 120, which can have a thickness of, e.g., 1-10 millimeters. This layer does not have to be perfectly flat, but can still include an uneven top surface. Nonetheless, the surfaces of the source material are much flatter when compared to a dendritic surface. This can result in the advantages mentioned above such as mitigating the likelihood the source material will be contaminated when being transported, makes it much easier (e.g., requires less time and heat) to precondition the source material to remove any contaminates, provides an easier target for laser heating, and the like.

In one embodiment, the process described in FIG. 2 occurs in a clean environment (e.g., under vacuum). For example, the press 200 may be in a glovebox, which can be filled with an inert gas (e.g., argon). For example, the substrate 120 and the uncompressed source material 215 can be introduced into the clean environment in sealed containers. For example, the uncompressed source material 215 may be transported in a vial filled with inert material (e.g., mineral oil) to prevent it from becoming contaminated. The vial can then be opened after it has been introduced into the clean environment. Thus, as the uncompressed source material 215 is placed on the substrate 120, it will not become contaminated.

Further, after the press 200 has flattened the source material 215 onto the substrate, a technician may place the resulting sample into a sealed container so it can be removed from the clean environment without being exposed to contaminates in the air. For example, the source material 215 and the substrate can be hermetically sealed with an indium seal or submersed in an inert material such as mineral oil.

Figure 3:
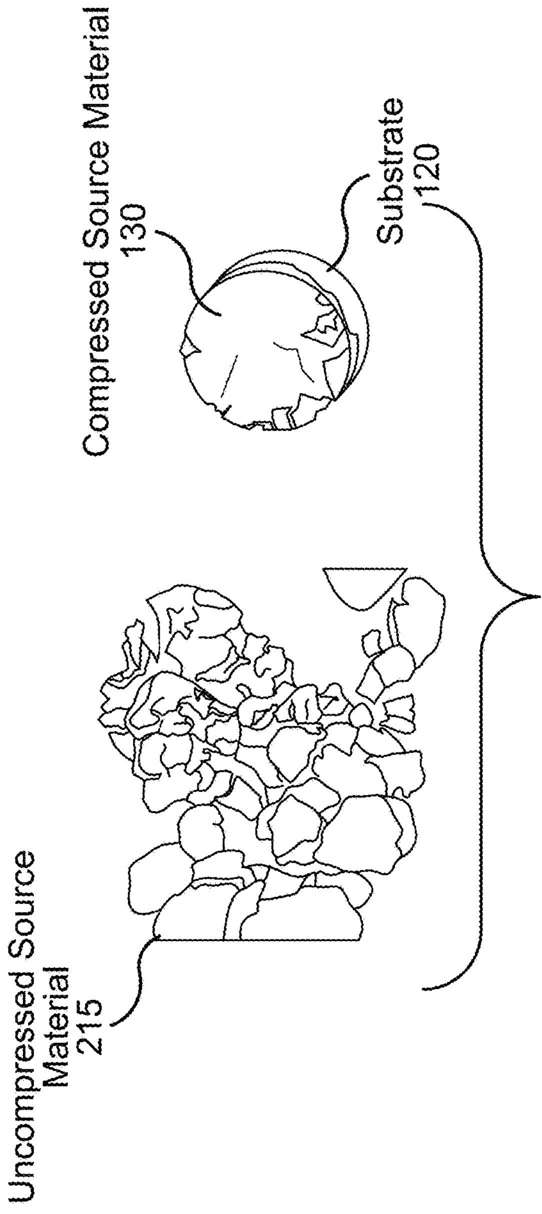
FIG. 3 illustrates compressing a dendritic material onto a substrate, according to one embodiment.

FIG. 3 illustrates compressing a dendritic material onto a substrate, according to one embodiment. That is, the left image in FIG. 3 illustrates a dendritic surface of Sr. This illustrates how Sr is typically produced and sold. The right image illustrates the result of pressing the Sr to form the compressed source material 130 on the substrate 120. That is, the right image illustrates the results of using the press 200 in FIG. 2 to compress the source material.

While the embodiments herein discussing pressing the source material 215 to reduce its surface area, other types of techniques can be used to alter the source material to reduce its surface area. For example, the source material 215 may be machined into a cylindrical shape as shown in FIG. 3. Or the source material 215 may be melted and put into a cast to form a desired shape. As such, the embodiments herein are not limited to using a press to reduce the surface area.

Figure 4:
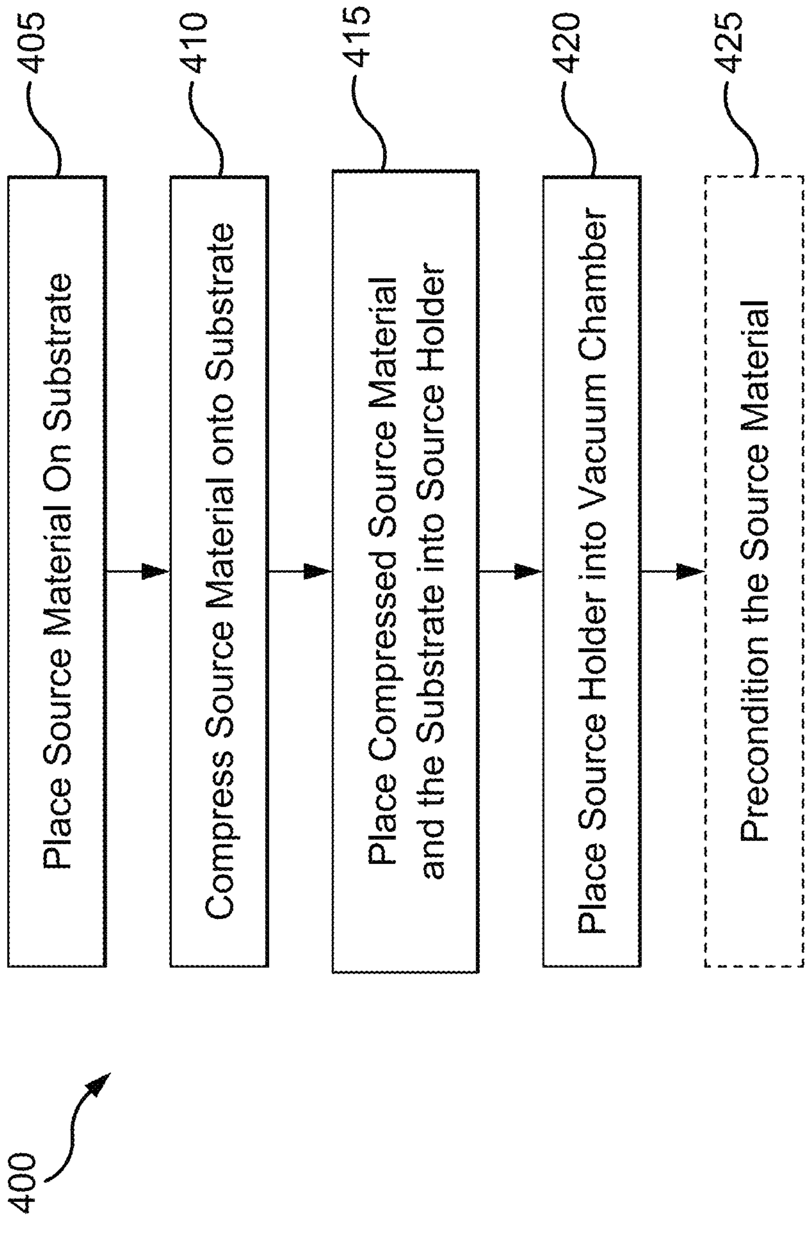
FIG. 4 is a flowchart for adding a compressed source material into a vacuum chamber, according to one embodiment.

FIG. 4 is a flowchart of a method 400 for adding a compressed source material into a vacuum chamber, according to one embodiment. For example, the vacuum chamber may be part of an ultra-cold atom apparatus for laser cooling and trapping. However, the embodiments are not limited to such. This embodiments herein can be applied to any apparatus that uses an atom source such as gravimeters, accelerometers, gyroscopes, and trace gas detection. These sensors may not use an atom cloud as shown in FIG. 1, or use laser cooling and trapping in order to perform their functions. For example, these sensors may use the atom vapor directly.

At block 405, the source material is placed on a substrate. As mentioned in FIG. 2, the substrate may first be placed in the base of a press. Further, the substrate and the source material may be disposed in a clean environment, such as a glovebox.

Moreover, the amount of source material placed on the substrate may depend on the desired lifetime of the device. Adding more source material extends the lifetime, but also requires more power to heat the material and may have a longer "turn on" time (e.g., the time it takes for the source material to be heated to a sufficient temperature to emit the atom vapor). Using less source material shortens the lifetime but saves power or can reduce the turn on time.

At block 410, the press compresses the source material onto the substrate. This compression at least partially flattens the source material, which reduces its overall surface area. The source material may have a dendritic or a crystalline surface before it is compressed; however, the embodiments herein may be beneficial for any source material that has a non-flat surface. Moreover, the source material does not have to be perfectly flat after compression in order to benefit from the embodiments herein.

In one embodiment, compressing the source material onto the substrate causes the source material to adhere to the substrate.

While some source material can be malleable enough to be pressed at room temperature, other source materials may be heated before being compressed onto the substrate.

At block 415, the compressed source material (now mounted on the substrate), is placed into a source holder. One example of a source holder will be discussed below in FIG. 5. In general, the source holder can be any apparatus that permits the compressed source material to be mounted inside the vacuum chamber.

In another embodiment, rather than pressing the source material onto the same substrate that is then inserted into the source holder, the source material may be pressed to reduce surface area on a different substrate. The source material could then be removed from that substrate (e.g., a non-transparent substrate) and attached to the desired substrate (e.g., a transparent substrate 120 in FIG. 1). Thus, the source material can be pressed to reduce surface area on any substrate but then removed from that substrate and placed on a desired substrate. This may be advantageous so that desired substrate is not damaged during the pressing process.

At block 420, the source holder is placed into the vacuum chamber. For example, the source holder can include an aperture that permits the atoms emitted by the source material (when heated) to exit the source holder and enter into the vacuum chamber. For example, as shown in FIG. 1, a source holder can include the baffle 125 which directs the vapor 135 into the area of the vacuum chamber 100 that creates the atom cloud 105.

In one embodiment, the blocks 405-420 may be performed in a same clean environment (e.g., a glovebox). For example, the press, the source holder, and the vacuum chamber may be in the glovebox. However, in another embodiment, the blocks 405-420 may be performed in different environments. For example, blocks 405 and 410 may be performed in a first environment after which the compressed source material is transported to a different environment where it is placed into the source holder, and then the vacuum chamber.

The method 400 also includes preconditioning the source material (which is illustrated in a hashed box to indicate it is optional). Preconditioning can be done between (or part of) any of the steps 410-420 after the source material has been compressed onto the substrate. Preconditioning can include heating the source material in the presence of a vacuum so that contaminants (e.g., oxide and/or hydroxide layers) are removed from its reactive surface. This can be performed before the vacuum chamber is put into operation (e.g., before generating an atom cloud, using the vacuum chamber as part of a sensor, etc.).

However, preconditioning may not be performed if the source material is kept sufficiently free from contaminants as it is being processed. In that case, block 425 may be omitted.

Figure 5:
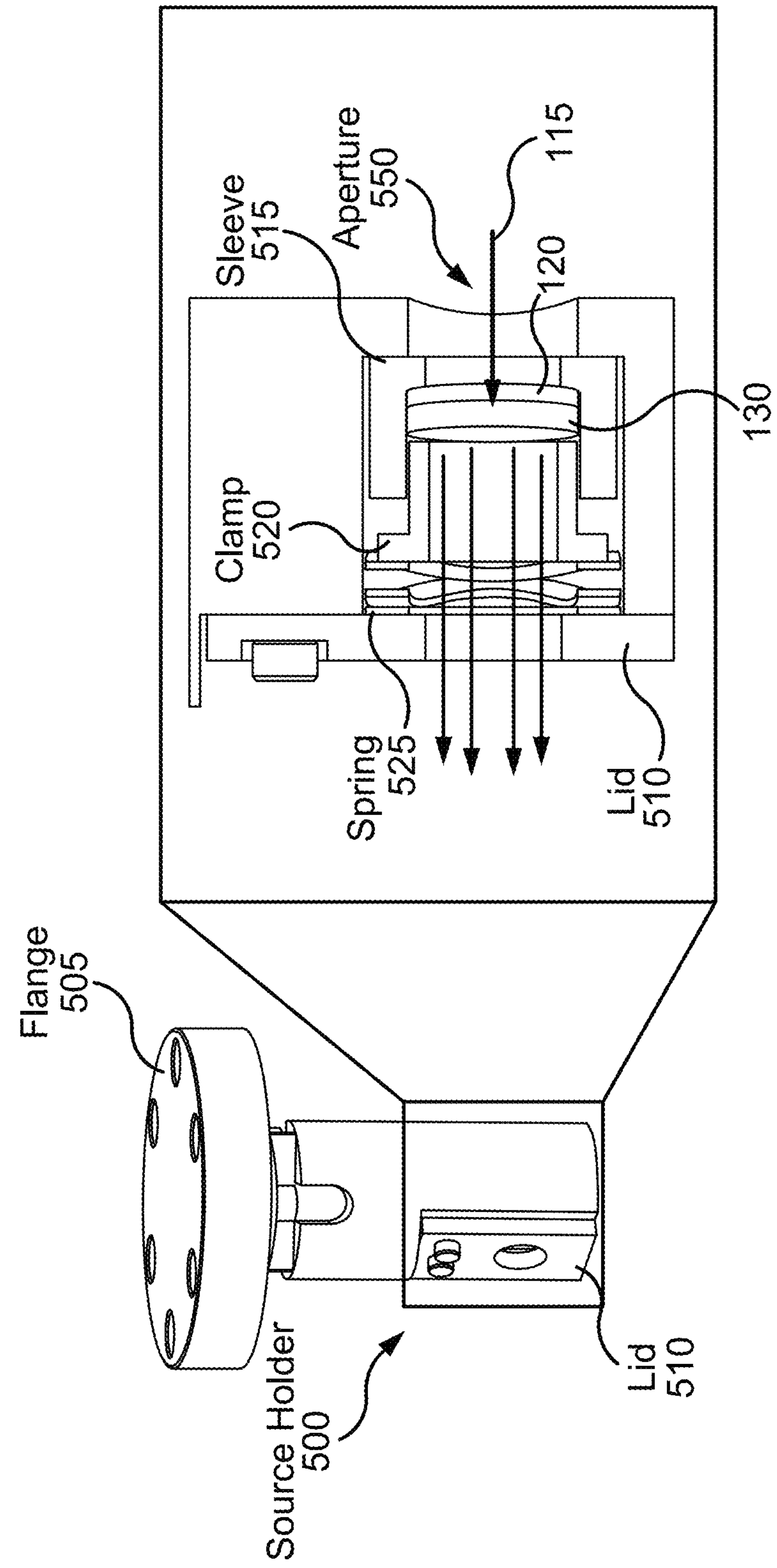
FIG. 5 illustrates a source holder, according to one embodiment.

FIG. 5 illustrates a source holder 500, according to one embodiment. The top of the holder 500 includes a flange 505 that can be used to attach the source holder 500 to a vacuum chamber. For example, the source holder 500 can be inserted into a vacuum chamber where the flange 505 is used to attach the holder 500 to the outside surface of the vacuum chamber. The flange 505 can be a UHV flange that creates an air tight seal with the surface of the vacuum chamber.

FIG. 5 also illustrates a side view of the inside of the source holder 500. Starting from the right, the side view illustrates an aperture 550 through which the laser (or multiple lasers) can pass through (along with a transparent substrate 120) to heat the compressed source material 130. In one embodiment, the aperture 550 may be aligned with the window 110 in the vacuum chamber 100 in FIG. 1 so that the laser can pass through both the window 110, the aperture 550, and the substrate 120 to reach the source material 130.

The source holder 500 includes a sleeve 515 (or collar) that has an inner dimension that substantially matches the diameter of the substrate 120 so that the substrate 120 is held in place in the sleeve 515.

Further, a spring-loaded clamp 520 applies a force to the compressed source material 130 to hold it and the substrate 120 in place in the sleeve 515. That is, a spring 525 is placed between a lid 510 (which can be screwed or bolted onto the source holder 500) to bias the clamp 520 which in turn holds the substrate 120 in the sleeve 515. This force may help to prevent the substrate 120 from moving as the source holder 500 experiences any accelerations (e.g., vibrations, is dropped, jostled, etc.).

Moreover, as the source material 130 is expended over the lifetime of the apparatus (i.e., as the source material 130 is depleted) the spring 525 can continue to apply pressure using the clamp 520 to hold the substrate 120 in place. That is, as the compressed source material 130 thins as the vapor is created, the clamp 520 and the spring 525 continue to hold the substrate 120 in the same location.

In one embodiment, the sleeve 515 and the clamp 520 are made from thermally insulating material to reduce heat loss which in turn reduces the amount of laser power required to heat the source material 130.

In this example, the lid 510 includes an aperture that permits the vapor emitted when the source material 130 is heated to exit the source holder 500 into the inner portion of the vacuum chamber. For example, the area to the left of the lid 510 may be the area where the atom cloud 105 shown in FIG. 1 is formed, or where some other measurement or experiment is performed, which can vary depending on the application (e.g., gravimeters, accelerometers, gyroscopes, etc.).

Figure 6:
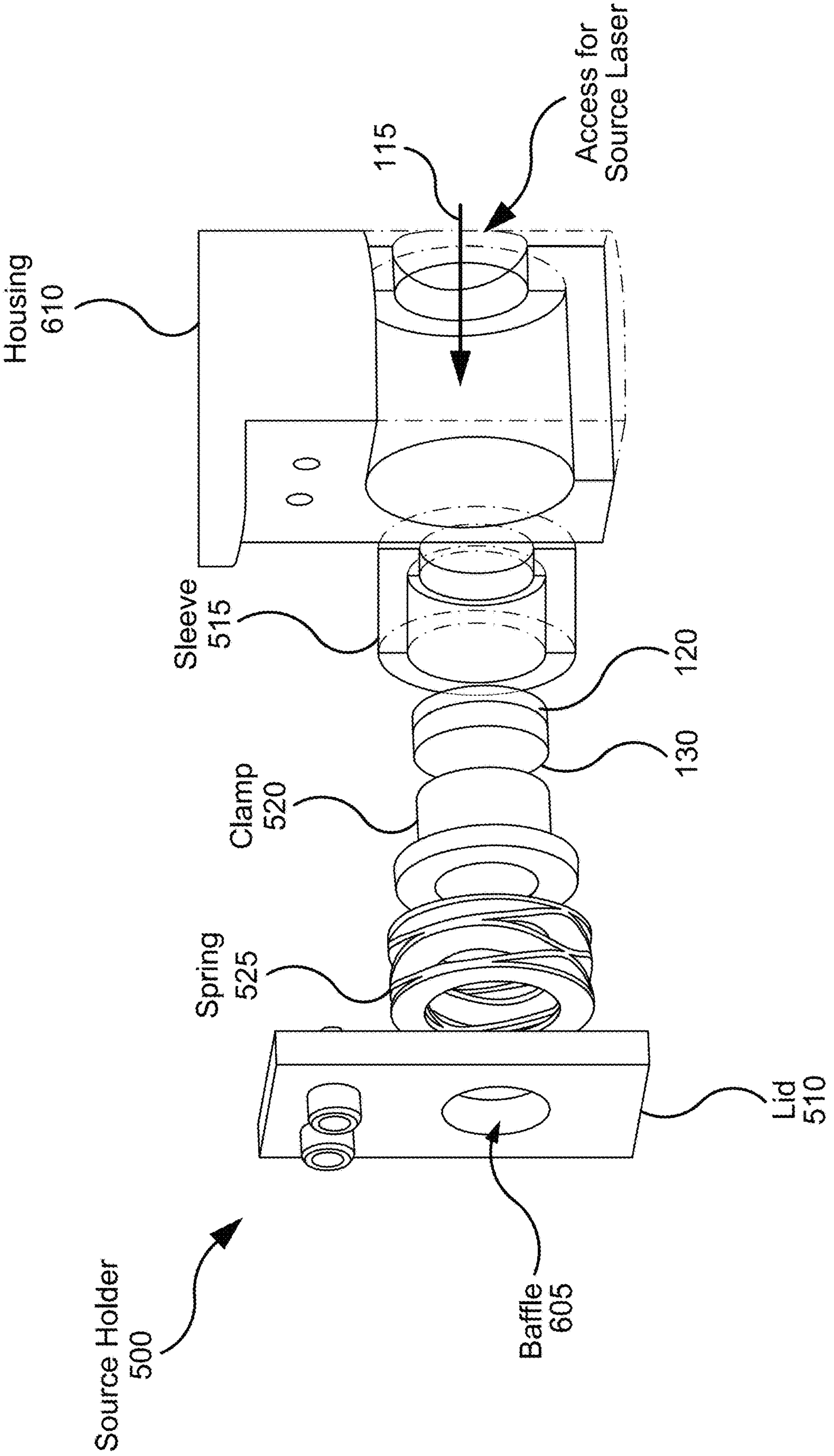
FIG. 6 is an exploded view of the source holder in FIG. 5, according to one embodiment.

FIG. 6 is an exploded view of the source holder 500 in FIG. 5, according to one embodiment. As shown, the lid 510, spring 525, clamp 520, source material 130, substrate 120, and sleeve 515 are shown external to a housing 610. FIG. 6 illustrates an order in which these components can be placed in the housing 610. That is, the sleeve 515 may first be slid into the housing 610, the combined substrate/source material can then be seated into the right side of the sleeve 515, and the clamp 520 can then be slid into the sleeve 515 until it contacts the source material 130. The spring 525 can be placed between the clamp 520 and the lid 510, and finally, the lid 510 can be screwed or bolted into the housing 610 to hold the assembly in place and to compress the spring 525 so it applies the bias to the clamp 520 and the substrate 120.

FIG. 6 also illustrates a baffle 605 (or aperture) in the lid 510 that permits the vapor emitted from the source material 130 to exit the housing and into the vacuum chamber. That is, the baffle 605 can be arranged to direct the vapor to a desired area within the chamber (e.g., the area where the atom cloud is formed). In one embodiment, a combination of the baffle 605 and the clamp 520 can serve as the baffle 125 shown in FIG. 1 which directs the vapor 135 to the desired area and prevents the vapor 135 from coating surfaces that it should not (e.g., windows or other apparatuses that may be in the vacuum chamber).

In addition, FIG. 6 illustrates that the spring 525 defines a first aperture through its center and the clamp 520 defines a second aperture through its center that are aligned with the aperture defined by the baffle 605. These apertures provide a pathway through which the atom vapor can pass in order to exit the housing 610 and reach a desired area where an atomic experiment or atomic application is being performed (e.g., the area where an atom cloud is formed).

Figure 7A:
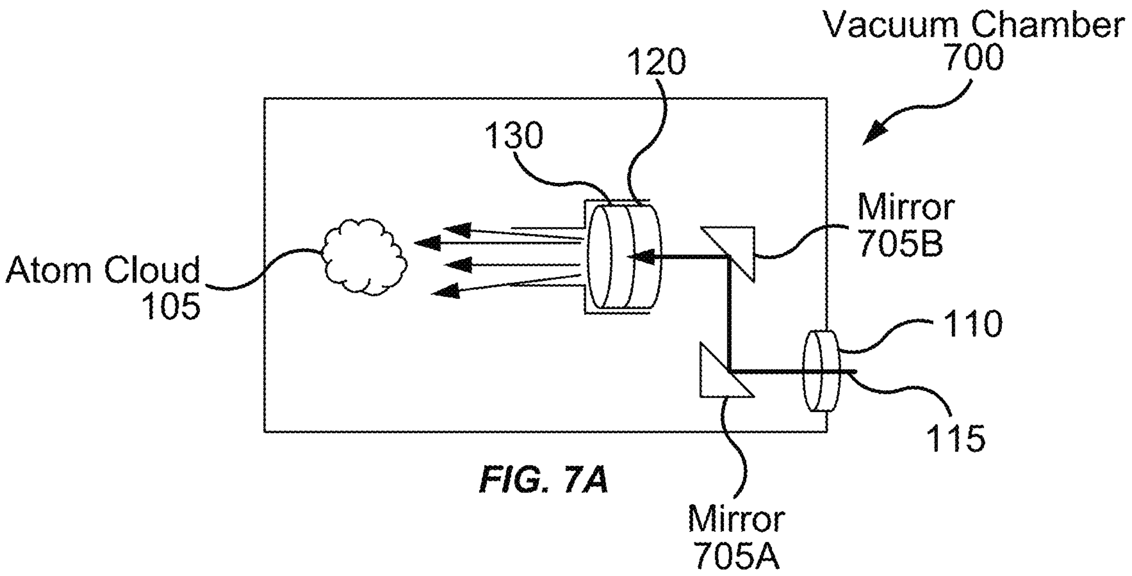
FIGS. 7A-7C illustrate heating a source material using a laser, according to embodiments.
Figure 7B:
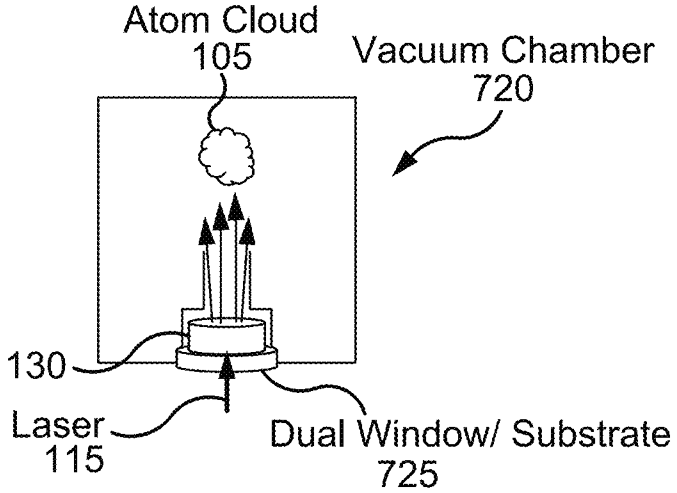
Figure 7C:
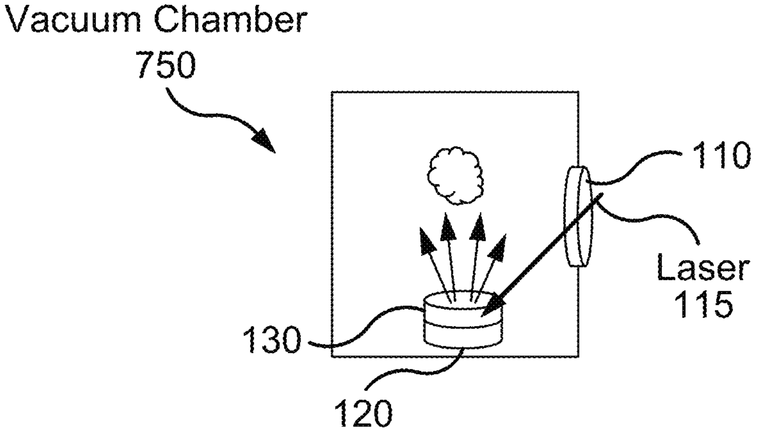

FIGS. 7A-7C illustrate heating a source material using a laser, according to several embodiments. FIG. 7A illustrates a vacuum chamber 700 similar to the chamber 100 shown in FIG. 1. As such, the same reference numbers are used to reference to similar components. However, the vacuum chamber 700 differs from the chamber 100 in that the window 110 is not aligned with the substrate 120. Instead, the vacuum chamber 700 includes mirrors 705A and 705B which redirect the laser 115 so that it ultimately aligns with the substrate 120 and the source material 130.

While two mirrors 705 are shown, the vacuum chamber 700 can have any number of mirrors (e.g., only one, or three, four, five, etc.) for aligning the laser 115 with the substrate 120 and the source material 130. In one embodiment, these mirrors may be disposed within the housing 610 of the source holder 500 as shown in FIG. 6. Alternatively, the mirrors may be disposed in a region in the vacuum chamber between the housing 610 and the window 110.

One advantage of using one or more mirrors 705 is that they provide additional flexibility for where the window 110 can be placed in the vacuum chamber 700. That is, the source material 130 does not have to be disposed along an axis that extends through, and is orthogonal to, the window 110. Using mirrors 705, the window can potentially be placed on any side of the vacuum chamber 700 (regardless whether those sides are orthogonal or parallel with the source material 130). Moreover, the substrate 120 (and potentially the baffle) prevents the atomic vapor from coating the mirrors 705

FIG. 7B illustrates a vacuum chamber 720 with a dual window/substrate 725. In this case, the substrate 725 on which the source material 130 is compressed also serves as a window for the vacuum chamber 720. That is, the transparent window/substrate 725 can be part of the outer surface of the vacuum chamber 720.

In one embodiment, after the source material 130 is pressed onto the substrate 725, this sample can then be attached to the surface of the vacuum chamber 720. Alternatively, the source material 130 may be pressed onto an already installed window of a vacuum chamber—i.e., the window may already be assembled into the chamber 720 and then the source material is pressed onto the window. Advantageously, this omits the need for a separate substrate and it may be easier to ensure the laser 115 strikes the source material 130 since it is disposed on the outer surface or wall of the vacuum chamber 720.

In another embodiment, rather than using the substrate as the window, the substrate can be directly pressed onto a vacuum window. For example, a transparent adhesive can be used to attach the substrate to the window of the vacuum chamber. In that case, the source material can first be compressed on to the substrate. This combined assembly can then be mounted or attached to a window of the vacuum chamber.

FIG. 7C illustrates a vacuum chamber 750 where the laser 115 strikes the source material 130 without passing through the substrate 120. In this case, the substrate 120 can be a non-transparent material, which may increase the number of suitable materials that can be used as the substrate 120. That is, both transparent and non-transparent substrate materials can be used in the embodiment shown in FIG. 7C.

However, FIG. 7C may not have a baffle, or if it has a baffle, the baffle is arranged (or has an aperture) so that the laser 115 can pass through the baffle to reach the source material 130. Because neither the baffle nor the substrate 120 may block the vapor from reaching the window 110, in one embodiment, the window 110 may be heated to prevent the atoms in the vapor from coating the window 110. However, the windows 110 shown in FIGS. 1, 7A and 7B may not be heated since the baffle and/or the substrate prevent the vapor from reaching the windows 110.

Figure 8:
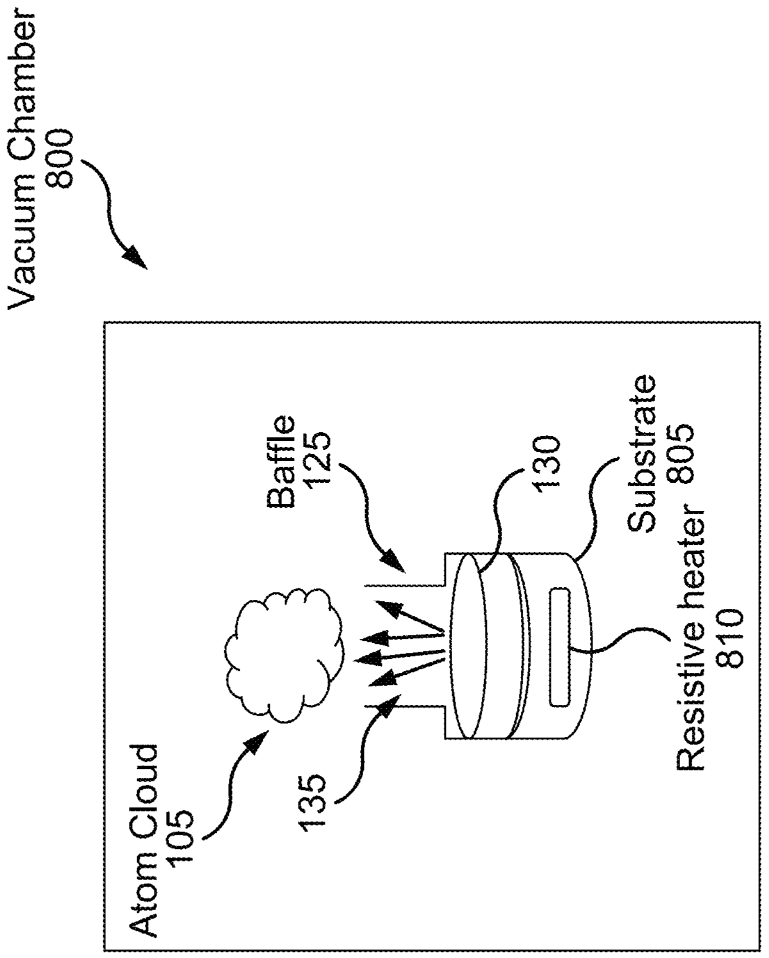
FIG. 8 illustrates heating a source material using a resistive heater, according to one embodiment.

FIG. 8 illustrates heating the source material 130 using a resistive heater 810, according to one embodiment. In this example, instead of using a laser to heat the material 130, the substrate 805 includes an integrated resistive heater 810. The heater 810 can be disposed in the substrate 805 before the source material 130 is pressed onto the substrate 805.

In one embodiment, the resistive heater 810 may be connected to electrodes in the vacuum chamber 800 that provide a current through the heater 810. This current can cause the heater 810 to heat the source material 130 (similar to the laser) so that the atomic vapor 135 is released. As such, FIG. 8 illustrates that the embodiments herein are not limited to using a laser to heat the source material. Further, while the resistive heater 810 is disposed in the substrate 805, it is not limited to such. In another example, the heater 810 can include a resistive coil that is wrapped around the periphery of the source material 130 and/or the substrate. However, as explained above, the current through the resistive heater 810 can create a magnetic field that may negatively affect the atom cloud 105. As such, moving the resistive heater 810 to be as far away as way as possible from the atom cloud 105 can mean the atom cloud 105 can be formed closer to the source material 130.

Also, because FIG. 8 is an example of an in-vacuum oven (because the heater 810 is inside the vacuum chamber 800), the size of the vacuum chamber 800 may be larger than if a laser were used. For instance, the heater 810 may rely on an electrical feedthrough with increases complexity and limits design flexibility. However, the use of an in-vacuum oven also means the window 110 shown in FIG. 1 can be omitted.

What is claimed is:

1. A vacuum chamber, comprising:

a source material that has been pressed onto a substrate to reduce surface area and to attach the source material to the substrate, wherein the source material emits an atom vapor when heated to perform an atomic experiment or an atomic application within the vacuum chamber; and a window disposed on a surface of the vacuum chamber so that a laser can pass through the surface to heat the source material, wherein the substrate is transparent such that the laser first passes through the substrate before reaching the source material.

2. The vacuum chamber of claim 1, wherein the substrate is not transparent and the laser does not pass through the substrate before reaching the source material.

3. The vacuum chamber of claim 1, wherein the laser is a continuous wave (CW) laser.

4. The vacuum chamber of claim 1, wherein the laser is a pulsed laser.

5. The vacuum chamber of claim 1, further comprising:

one or more mirrors arranged in the vacuum chamber to reflect the laser to reach the source material.

6. A vacuum chamber, comprising:

a source material that has been pressed onto a substrate to reduce surface area and to attach the source material to the substrate, wherein the source material emits an atom vapor when heated to perform an atomic experiment or an atomic application within the vacuum chamber, wherein the substrate is attached to the window.

7. A vacuum chamber, comprising:

a source material that has been pressed onto a substrate to reduce surface area and to attach the source material to the substrate, wherein the source material emits an atom vapor when heated to perform an atomic experiment or an atomic application within the vacuum chamber, wherein the substrate forms a window disposed on a surface of the vacuum chamber so that a laser can pass through the substrate to heat the source material.

8. A vacuum chamber, comprising:

a source material that has been pressed onto a substrate to reduce surface area and to attach the source material to the substrate, wherein the source material emits an atom vapor when heated to perform an atomic experiment or an atomic application within the vacuum chamber; and a source holder comprising:

a sleeve for holding the substrate and the source material; and a spring configured to apply a bias to hold the substrate and the source material in the sleeve.

9. The vacuum chamber of claim 8, wherein the source holder further comprises:

a clamp, wherein the spring is configured to apply the bias to the clamp which in turn contacts the substrate or the source material.

10. The vacuum chamber of claim 9, wherein the sleeve and the clamp comprise thermally insulating materials.

11. The vacuum chamber of claim 9, wherein the source holder further comprises:

a baffle configured to prevent the atom vapor from reaching undesired areas within the vacuum chamber where the atomic experiment or atomic application is not being performed, wherein the spring and the clamp are disposed between the baffle and the substrate.

12. The vacuum chamber of claim 11, wherein a first aperture defined by the clamp and a second aperture defined by the spring are aligned with the baffle such that the atom vapor passes through the first aperture, the second aperture, and the baffle to reach a desired area.

13. A vacuum chamber, comprising:

a source material that has been pressed onto a substrate to reduce surface area and to attach the source material to the substrate, wherein the source material emits an atom vapor when heated to perform an atomic experiment or an atomic application within the vacuum chamber; and a resistive heater configured to heat the source material to emit the atom vapor.

14. The vacuum chamber of claim 13, wherein the resistive heater is integrated into the substrate.

15. The vacuum chamber of claim 1, A vacuum chamber, comprising:

a source material that has been pressed onto a substrate to reduce surface area and to attach the source material to the substrate, wherein the source material emits an atom vapor when heated to perform an atomic experiment or an atomic application within the vacuum chamber, wherein the substrate is at least one of sapphire or glass.

16. The vacuum chamber of claim 1, wherein the atomic experiment or the atomic application comprises creating a cold atom cloud from the atom vapor using a 2D magneto-optical trap (MOT), a 3D MOT, or Zeeman slowing; or creating an atomic vapor beam.

17. A method comprising:

placing source material on a substrate, wherein the source material has a dendritic surface before being pressed;

pressing the source material onto the substrate to reduce a surface area of the source material, wherein the source material is attached the substrate; and placing the source material and the substrate into a vacuum chamber that is configured to use an atom vapor emitted when the source material is heated to perform an atomic experiment or application.

18. The method of claim 17, wherein the source material has a thickness of 1-10 millimeters after being flattened, wherein a thickness of the substrate is between 1-10 millimeters.

19. A method comprising:

heating a source material in a vacuum chamber to emit an atom vapor, wherein the source material has been pressed onto a substrate to reduce surface area and to attach the source material to the substrate, wherein a window is disposed on a surface of the vacuum chamber so that a laser can pass through the surface to heat the source material, wherein the substrate is transparent such that the laser first passes through the substrate before reaching the source material; and perform an atomic experiment or an atomic application within the vacuum chamber using the atom vapor.

* * * * *